US012791751B2

(12) United States Patent
Laïchoubi et al.

(10) Patent No.: US 12,791,751 B2
(45) Date of Patent: Nov. 10, 2026

(54) MAPPING METHOD FOR MONITORING THE STATE OF AND/OR GEOLOCATING A BURIED, HALF-BURIED OR SUBMERGED STRUCTURE, AND ASSOCIATED GEOLOCATION METHOD

(71) Applicant: SKIPPER NDT, Pau (FR)

(72) Inventors: Mehdi Laïchoubi, Paris (FR); Sylvain Decombe, Asnieres sur Seine (FR)

(73) Assignee: SKIPPER NDT, Pau (FR)

( * ) Notice: Subject to any disclaimer, the term of this patent is extended or adjusted under 35 U.S.C. 154(b) by 205 days.

(21) Appl. No.: 18/835,169

(22) PCT Filed: Jan. 25, 2023

(86) PCT No.: PCT/EP2023/051749

§ 371 (c)(1),
(2) Date: Aug. 1, 2024

(87) PCT Pub. No.: WO2023/148057

PCT Pub. Date: Aug. 10, 2023

(65) Prior Publication Data

US 2025/0138215 A1 May 1, 2025

(30) Foreign Application Priority Data

Feb. 2, 2022 (FR) ...................................... 2200925

(51) Int. Cl.
*G01V 3/38* (2006.01)
*G01V 3/165* (2006.01)

(52) U.S. Cl.
CPC ................ *G01V 3/38* (2013.01); *G01V 3/165* (2013.01)

(58) Field of Classification Search
None
See application file for complete search history.

(56) References Cited

U.S. PATENT DOCUMENTS 5,629,626 A * 5/1997 Russell .................... G01V 3/08 342/357.68
2002/0130664 A1* 9/2002 Birken ..................... G01V 3/15 324/329
2006/0004519 A1* 1/2006 Humphrey ............... G01V 7/16 702/3

(Continued)

OTHER PUBLICATIONS

International Search Report from International Application No. PCT/EP2023/051749 Mar. 29, 2023, 3 pgs.

(Continued)

*Primary Examiner* — Jas A Sanghera
(74) *Attorney, Agent, or Firm* — Tutunjian & Bitetto, P.C.

(57) ABSTRACT

The present invention relates to a mapping process for the condition inspection and/or geolocation of a buried, semi-buried or submerged structure and associated geolocation process. The mapping process includes a step of scanning a zone to be inspected. Magnetic field and position data are acquired by magnetometers associated with position sensors. Measurements from the acquisition step are processed to correct the data according to environmental parameters during data acquisition. A interactive magnetic data map is generated allowing an operator to delete, add and/or modify one or more surfaces directly on the interactive magnetic data map.

12 Claims, 8 Drawing Sheets

(56) References Cited

U.S. PATENT DOCUMENTS

| | | | | |
|---|---|---|---|---|
| 2009/0128156 | A1* | 5/2009 | Li | G01V 3/38 702/57 |
| 2014/0149037 | A1* | 5/2014 | Haber | G01V 3/08 702/2 |
| 2016/0170090 | A1* | 6/2016 | Collins | G01C 15/00 702/5 |
| 2023/0057978 | A1* | 2/2023 | Forge | G01V 20/00 |

OTHER PUBLICATIONS

Laïchoubi, Mehdi, et al., "Pinpointing the Right Location", World Pipelines, Mar. 1, 2021, pp. 1-4.

Tchernychev Mikhail, "MAGPICK—magnetic map & profile processing. User Guide" Dec 12, 2013, pp. 1-212.

* cited by examiner

MAPPING METHOD FOR MONITORING THE STATE OF AND/OR GEOLOCATING A BURIED, HALF-BURIED OR SUBMERGED STRUCTURE, AND ASSOCIATED GEOLOCATION METHOD

TECHNICAL FIELD

The present invention relates to a mapping process for the condition inspection and/or geolocation of a buried, semi-buried or submerged structure. The present invention will find its main application in three-dimensional geolocation of pipes or pipelines for the transfer of liquids or gases.

However, the present invention may also be used for the detection and geolocation of other types of structures or for broader geophysical purposes. Furthermore, the invention may also advantageously be used for external structure inspection in order to remotely determine the condition of a buried or semi-buried structure.

PRIOR ART

Geolocation of buried structures is a well-known and widely documented challenge for system operators. Updating the geolocation of a structure is particularly important in order to allow excavation work to be carried out in the vicinity of the latter, or to check the integrity of a structure.

The geolocation of a structure is made necessary by various factors, including lack of accuracy when installing the structure, incorrect recording of the position of the structure, loss of archives, or ground movements, resulting in a shift of the structure.

To carry out this geolocation, exploration devices are known, using different technologies such as radio detection, radar, lidar, or techniques based on magnetic field measurement.

These devices physically consist of vehicles such as a cart, measuring pole or drone, equipped with sensors; they provide the geolocation of the structure, with varying degrees of accuracy or errors. Each technique has constraints of use and limitations, particularly with regard to the vertical or horizontal accuracy of the geolocation of the structure.

In general, these devices make it possible to generate, based on the measurements made by the sensors and a geolocation system, a set of geolocation points of the structure making it possible to produce a 2D or 3D geolocation map.

A first drawback of these systems is that they cannot be used to solve geolocation problems if several nearby structures are present and, for example, when pipes are close together or are locally superposed. In particular, the presence of several structures may thus lead to aberrations in the generation of the geolocation map which are sources of errors for the operator.

A second drawback of these devices is that the quality of the measurements varies depending on the terrain, the environment or even the signature of the structure, which is not constant.

For example, the measurement of magnetometers may be skewed by the presence of metallic or magnetic objects other than the structure, locally modifying the magnetic field.

This variation in measurement accuracy affects the accuracy of the geolocation map of the structure at some points, without the user knowing which parts of the map may be less accurate or imperfect.

The present invention aims to overcome the aforementioned drawbacks in the field of geolocation based on magnetometers. It thus represents an enhancement of geolocation techniques using magnetic fields based on a vehicle equipped with magnetometers.

Note that this geolocation technique based on magnetometers is based on accurate magnetic mapping of the surface overlying the source of a potential magnetic field other than that of the Earth, called the magnetic anomaly field.

This magnetic anomaly mapping makes it possible, based on a physical model, based on the nature of the measured source, to infer the position of the source from the emitted magnetic signal.

This source may be either of a magnetic nature (magnetization) or of an electromagnetic nature with, for example, the injection of an electrical current at the source using a current generator.

Subject Matter of the Invention

A first aim of the present invention is that of solving all or some of the technical problems associated with the aforementioned prior art.

A further aim of the present invention is that of providing a mapping process making it possible to provide an interactive magnetic data map that can be modified manually to improve the quality of the geolocation of a structure.

A further aim of the present invention is that of providing a mapping process making it possible to provide an interactive magnetic data map making it possible to visualize at least two separate structures to generate a location map of at least one of the structures.

A further aim of the present invention is that of providing a mapping process providing an interactive magnetic data map making it possible to distinguish several areas so as to generate a location map with different levels of accuracy or resolution.

SUMMARY OF THE INVENTION

The invention aims to protect a mapping process for the condition inspection and/or location of a buried, semi-buried or submerged structure including a metallic or magnetic material wherein, based on a vehicle equipped with magnetometers, the following steps are carried out:

- a step of scanning a zone to be inspected,
- a step of acquiring magnetic field and position data by the magnetometers associated with position sensors,
- a step of processing the measurements from the acquisition step to correct the data according to environmental parameters during data acquisition,
- a step of generating an interactive magnetic data map allowing an operator to delete, add and/or modify one or more surfaces directly on the interactive magnetic data map.

The present invention furthermore aims to protect a process for locating a buried, semi-buried or submerged structure including a metallic or magnetic material wherein, based on the interactive magnetic data map obtained with the mapping process as cited above, the following steps are carried out:

- a manual optimization step for deleting, adding or modifying at least one zone directly on the interactive magnetic data map,
- a step of generating a location map of the structure by using the modified interactive magnetic data map and at least one model linking the magnetic field of a structure with its spatial position.

DESCRIPTION OF THE FIGURES

The present invention will be better understood on reading a detailed example embodiment with reference to the appended figures, provided by way of non-limiting example, among which

DETAILED DESCRIPTION

The present invention aims to protect a mapping process for the condition inspection and/or location of a buried, semi-buried or submerged structure.

Figure 1:
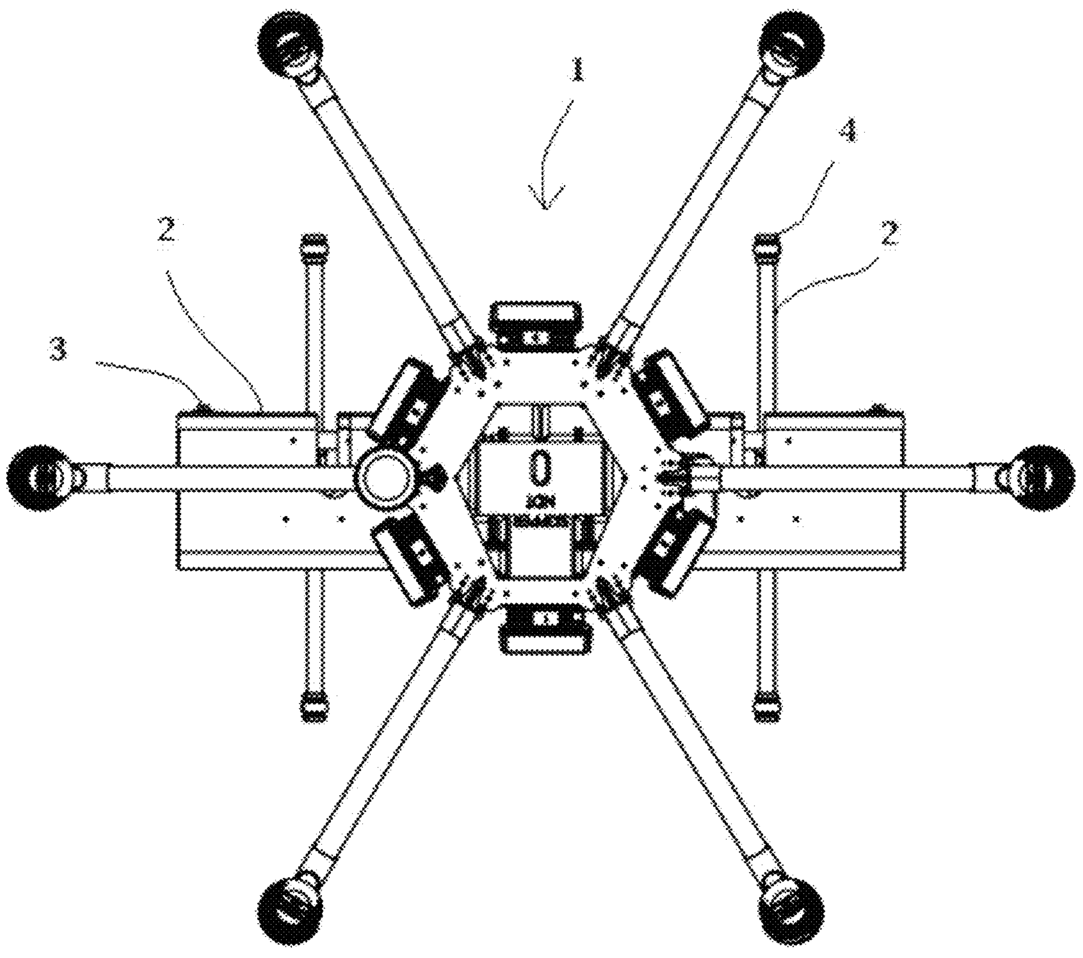
FIG. 1 represents a schematic example embodiment of a device according to the invention, in a perspective view.

With reference to FIG. 1, an example embodiment of a drone 1 equipped with sensors 2 is seen.

In other embodiments, another type of vehicle known to a person skilled in the art may be used as a tool to perform exploration and inspection and in particular a wheeled or tracked cart, optionally motorized.

In the example embodiment of FIG. 1, the sensors 2 are sensors of the following types: positioning sensors 3 with at least one remote detection sensor, a GNSS position sensor, an inertial unit including a gyroscope and an accelerometer, and magnetic sensors 4 for measuring the magnetic field.

The positioning sensors 3 record the movements of the drone 1 and enable the acquisition of the positions of the drone 1 during the step of scanning the zone to be inspected, while the magnetic sensors 4 enable the acquisition of magnetic field data. These magnetic sensors 4 are advantageously arranged spaced horizontally from 5 to 15 cm depending on the vehicle. The arrangement and the number of magnetic sensors 4 make it possible to record the magnetic environment of the pipe to be inspected in the three spatial directions.

Figure 2:
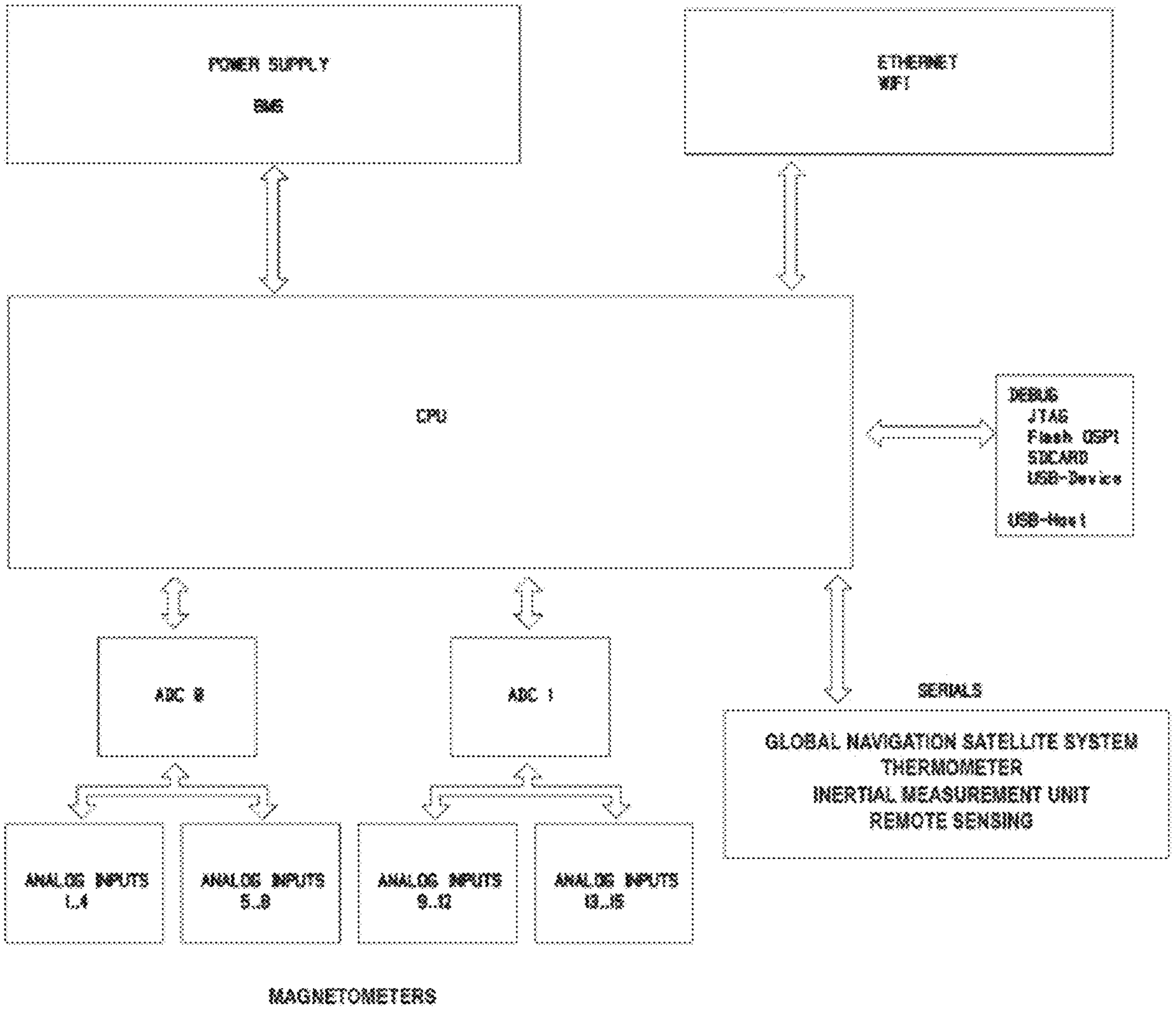
FIG. 2 represents a schematic view of the electronic board for implementing the process according to the invention.

All the positioning and measurement data of the magnetic field are picked up and processed by an electronic board as shown in FIG. 2 with a step of analog digital conversion of the measurements and a synchronization of the data.

According to the mapping process, a step of scanning a zone to be inspected is first performed. Hereinafter in the application, zone will be understood to mean the geographical area(s) scanned by the vehicle. This step makes it possible to simultaneously perform the step of acquiring magnetic field and position data by the magnetometers associated with position sensors.

Different scanning possibilities of the zone to be inspected may be envisaged, the choice by the operator is made according to the type of mapping expected and whether or not there is prior knowledge of the positioning of the structure to be inspected.

Figure 3:
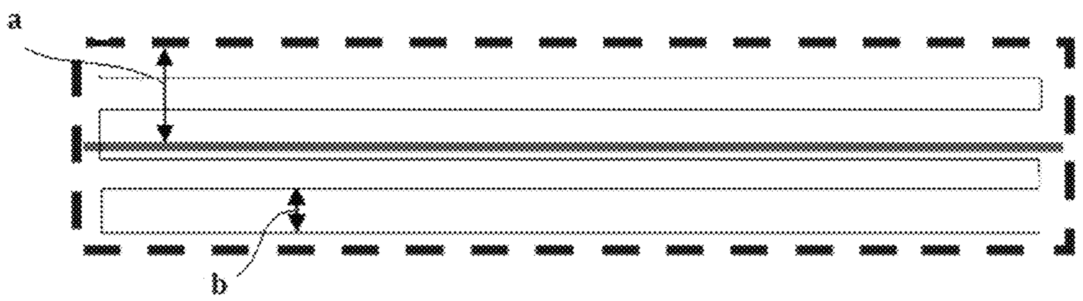
FIG. 3 represents an example embodiment of the steps of scanning and acquiring the magnetic data in a top view.
Figure 4:
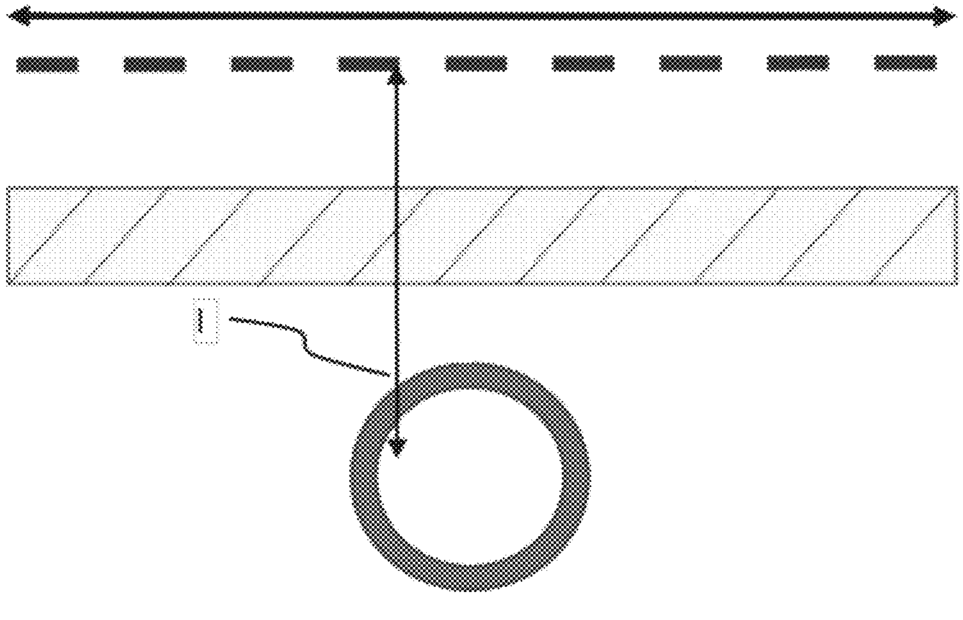
FIG. 4 represents the example embodiment of FIG. 3 in a sectional view.

With reference to FIG. 3, an advantageous example embodiment of the path of a drone 1 scanning the surface perpendicular to the structure to be geolocated is represented. In this example, so-called profile scanning is carried out, this scanning allows dense and complete mapping of the magnetic anomaly generated by a buried source.

In FIG. 3, the inspection zone is represented by dotted lines, the thin line corresponds to the path of the drone 1, while the thick line represents the structure to be inspected. The path of the drone is substantially centered on the structure and follows a route allowing magnetic recording along surface strips substantially parallel to the structure.

The scanning step is thus carried out via successive parallel strips substantially in the main axis of the structure, the width of each strip depending on the spacing between the magnetic field sensors and the resolution to be obtained, the width of the scanned zone depending on the vertical distance between the magnetic field sensors and the center of the structure.

A set of conditions links the different parameters cited in FIG. 3. The minimum inspection zone is centered on the structure to be inspected. Its half-width is a function of l, corresponding to the distance between the acquisition plane and the center of the structure to be detected. The width between each profile b is a function of the width of the measuring bar used and the desired resolution for the magnetic map.

In another embodiment, the scanning step will consist of so-called cross scanning. This type of scanning may be used in particular before so-called profile scanning in order to pre-locate the structure more quickly in a large search zone. In this mode, the width of the sides crossed by the drone 1 must be greater than the width of the minimum inspection zone 2*a*. The distance between two sides crossed depends on the desired point density per meter.

During the scanning step, the process performs the magnetic field and position data acquisition step. This step may be performed on all or part of the route followed by the drone 1 during scanning and makes it possible to record the data necessary for mapping.

The process then consists of carrying out a step of processing the measurements from the acquisition step to correct the data according to environmental parameters during data acquisition.

Data processing may comprise different steps for correcting position data, magnetic data or allowing frequency filtering according to interfering emission in certain frequencies during data acquisition. These steps are carried out after the data acquisition by the drone 1.

The processing may further comprise processing prior to data acquisition, namely calibration to compensate for magnetic sources associated with the vehicle. The magnetic sensor calibration protocol is advantageously carried out before or after a measurement series. The purpose of calibration is to calculate the errors intrinsic to the triaxial magnetometers in order to be able to compensate them and allow a more accurate measurement of the norm. There are 9 errors to be determined, comprising the sensitivity S ($s_1$, $s_2$, $s_3$), the non-orthogonality of the axes of the coils (of angles $u_1$, $u_2$, $u_3$) and the bias/offset O=($o_1$, $o_2$, $o_3$) for each of the 3 components ($F_1$, $F_2$, $F_3$) of the measured magnetic field. The relationship linking the output of the sensors $F=(F_1, F_2, F_3)$, the measured magnetic field, and $B=(B_1, B_2, B_3)$ the actual magnetic field corresponds to:

$$F = S \times P \times B + O$$

Where $$S = \begin{bmatrix} s_1 & 0 & 0 \\ 0 & s_2 & 0 \\ 0 & 0 & s_3 \end{bmatrix}$$

$$P = \begin{bmatrix} 1 & 0 & 0 \\ -\sin u_1 & \cos u_1 & 0 \\ \sin u_2 & \sin u_3 & \sqrt{1-\sin^2 u_2 - \sin^2 u_3} \end{bmatrix}$$

Therefore $$B = P^{-1} \times S^{-1} \times (F - O)$$

Based on this definition of the actual magnetic field, it is simply necessary to find the parameter nonuplet that minimizes the difference between the intensity of the measured magnetic field and that of the actual magnetic field. The calibration step makes it possible to compensate magnetic sources caused by the measurement vector (batteries, structure, etc.). The protocol consists in rotating the vector carrying the magnetometers in all spatial directions at a point where the intensity of the magnetic field is almost constant. To this end, the calibration step includes a movement of the vehicle in several spatial directions while recording measurements of a substantially constant magnetic field to modify the acquisition parameters so as to minimize the difference between the intensity of the actual magnetic field and the intensity measured by the magnetometers.

The data processing step also includes, once the position data have been acquired, advantageously a step of correcting the navigation data.

This navigation data correction step is carried out by correcting the position recorded by the drone, on one hand, and, on the other, by correcting its attitude measurement.

Advantageously, the process uses, for position correction, a method for correcting the position of a moving vehicle and in particular of a drone 1 from a fixed base. For this purpose, a base is placed at a reliably known position, it is this base that sends the necessary corrections by radio to the processing means, it being possible to transmit the data in real time.

In order to obtain reliable measurements, it is also important to make data corrections according to the attitude of the drone 1. For this purpose, the use of the inertial unit to monitor the rotation and translation movements of the drone relative to itself is provided. The attitude correction makes it possible to match the magnetic vectors (Bx, By, Bz) of the magnetometers with the unique terrestrial magnetic reference frame known as NED (North East Down).

This attitude correction includes, on one hand, an estimation of the attitude by the gyroscope of the inertial unit, then, on the other, a correction by the accelerometer of the inertial unit.

Estimations of the attitude of the gyroscope make it possible to assess rapid movements. The gyroscope may be represented by this quaternion: $S_w=[0w_xw_yw_z]$ The variation in the orientation of the gyroscope with respect to the terrestrial reference frame gives:

$$ {}^S_E\dot{q} = \frac{1}{2}\, {}^S_E\hat{q} \otimes S_w $$

It can be stated that the quaternion derivative over time describing the change of orientation of the gyroscope with respect to the NED reference frame representing the attitude of one of our machines is:

$$ {}^S_E\dot{q}_{w,t} = \frac{1}{2}\, {}^S_E\hat{q}_{est,t-1} \otimes S_{wt} $$

$$ {}^S_E q_{w,t} = {}^S_E\hat{q}_{est,t-1} + {}^S_E\dot{q}_{w,t}\Delta_t $$

where "est, t−1" is the estimation of the previous rotation.

These estimations are considered accurate on short time scales. However, the gyroscopic data deviate slightly over time, and this affects the calculations, even with the removal of sensor bias. The accelerometer is used to obtain a better attitude by compensating for the time drift of the gyroscope.

A stabilizing term calculated as a function of the current quaternion, the measured and corrected acceleration, the mean of the magnetic data, and terrestrial gravity and terrestrial magnetic field values determined by the GNSS coordinates of the inspected location is added. This vector is the gradient of the function that calculates the deviation between the measurements made in the reference frame corresponding to the quaternion and the expected values. A small multiple is therefore removed from this vector so that the quaternion is modified toward the starting quaternion. The quaternion is then updated according to the gradient method, with this product of the attitude quaternion and that of the gyroscopic vector multiplied by the time interval.

Figure 5:
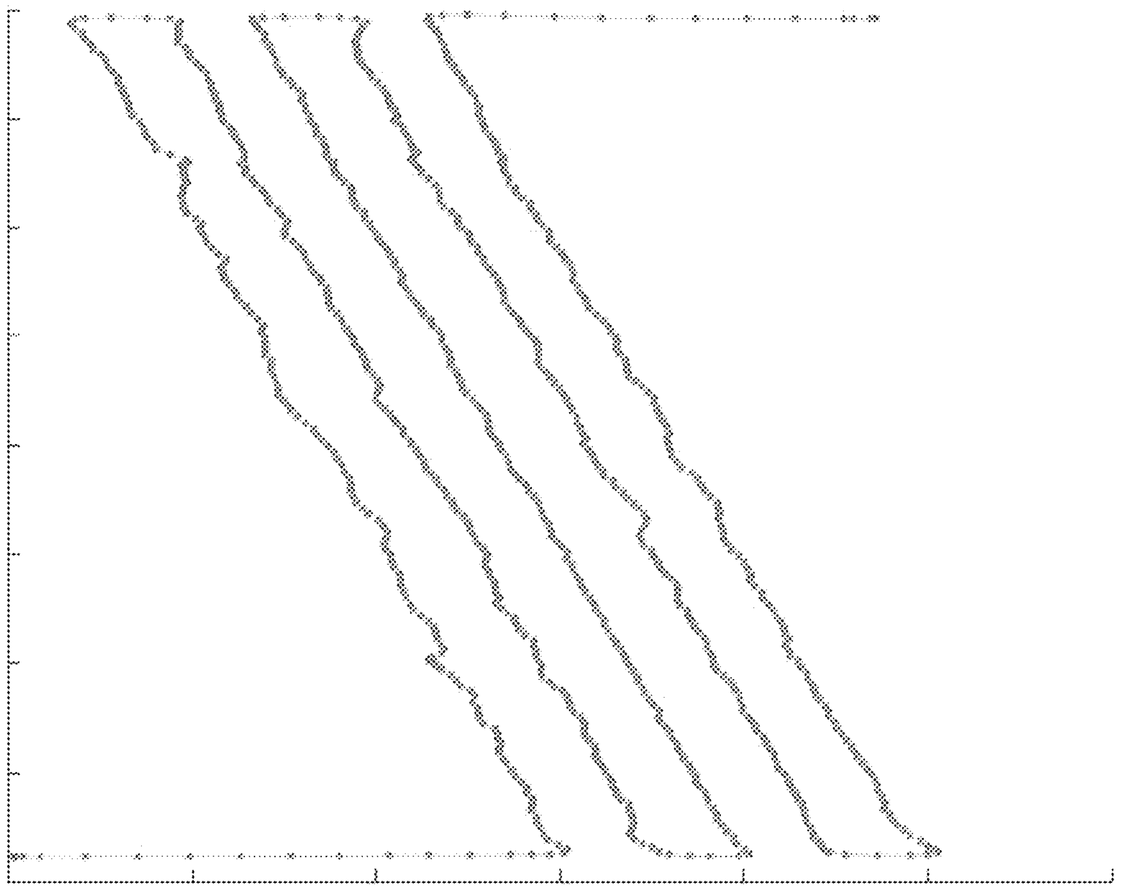
FIG. 5 represents an example of a vehicle trajectory over a zone to be inspected in graph form.

FIG. 5 represents an example of position measurements after processing in graph form, five substantially parallel profiles corresponding to the movement of the drone 1 are thus seen represented. The horizontal sections at the bottom and top of FIG. 5 correspond to the anonymized GNSS antenna latitude data on the y-axis and longitude data on the x-axis. Note that the GNSS system is used to determine the position and speed of a point on the surface or in the vicinity of the Earth, by processing radio signals from several artificial satellites, received at this point.

According to an advantageous feature of the invention, the data processing step furthermore includes a frequency filtering step. This filtering step is useful in the case of interference of a frequency by the environment, filtering the frequency or the frequency range makes it possible to eliminate the interference and keep the measurements in the frequencies most suitable for the detection and the location of the structure. Another benefit of this filtering is the ability to focus only on one spectrum interval to detect a frequency range.

According to a non-limiting embodiment, filtfilt type filtering applied to the Euclidean norm of the components of each magnetometer is used, this type of filtering includes a first filtering, a signal inversion, a second filtering and another inversion. Digital filtering is zero-phase.

The calculation of the coefficients used for filtering is carried out by a digital filtering algorithm with finite time pulse response.

Advantageously, the filters are configured according to the following configurations:

Bandpass: applied to one or more frequency ranges of interest.

This may be the injection frequency or a detectable frequency, isolated and carried by the inspected structure (e.g. 50/60 Hz or one of its harmonics).

For single frequencies or frequency ranges to be isolated, the two cut-off frequencies $f_{c1}$ and $f_{c2}$ are equal to ±1 Hz of the frequency or interval of interest and of the order 1000;

Low-pass: cut-off frequency $f_c$=2 Hz and of the order 1000;

Notch filter of the order 1000 for 50 Hz and its harmonics.

Figure 6:
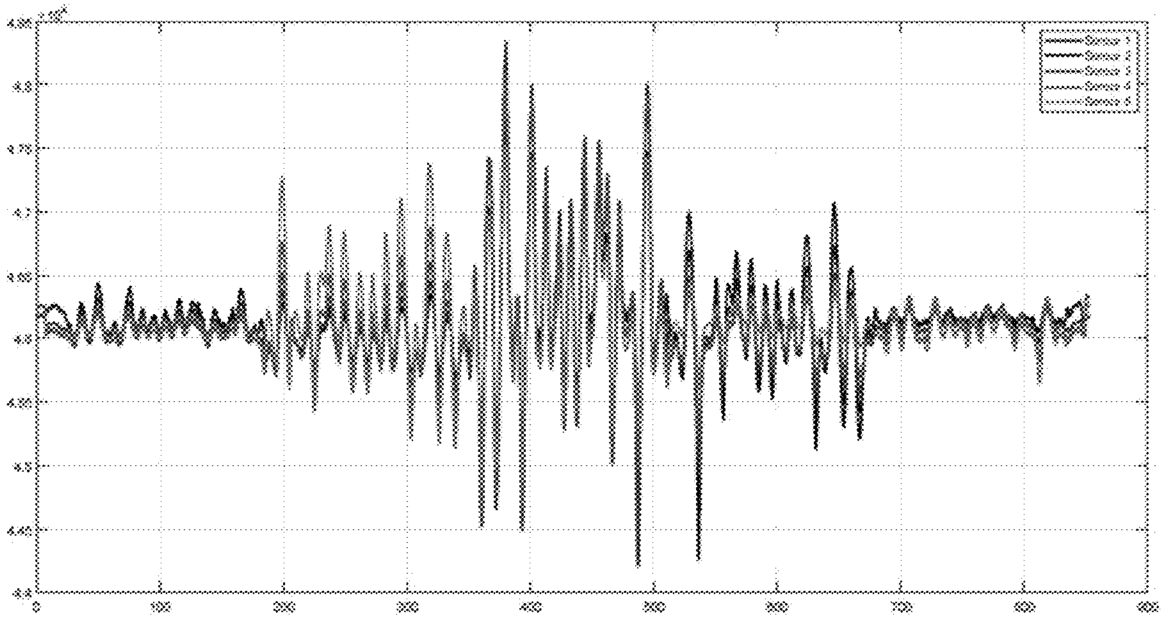
FIG. 6 represents an example of unfiltered magnetic data measurements as a function of time in graph form.

FIG. 6 represents an example of magnetic data measurements after processing in graph form. These consist of data after processing, according to a Euclidean norm of the three components of each magnetic sensor (in nT) as a function of time (in seconds), then with bandpass filtering of each magnetic sensor as a function of time.

From the step of processing the measurements to the acquisition step to correct the data according to environmental parameters during data acquisition, the mapping process includes a step of generating an interactive magnetic data map. This interactive magnetic data map allows an operator to delete, add and/or modify one or more surfaces directly on the interactive magnetic data map.

In the step of generating the interactive magnetic data map, the processing means merge the position data as represented in FIG. 5 with the magnetic data as represented in FIG. 6.

To perform the merge, the position data are interpolated linearly at the same frequency as the magnetic data, and in particular advantageously at 2000 Hz, so that each magnetic data item is linked with a spatial position.

The parallel profiles are then selected by cutting the transitions, i.e. the paths to pass from one profile to another and represented in FIG. 5 by the substantially horizontal parts. The positions of each sensor are deduced relative to the antenna taking into account the geometry of the sensor bar, the inter-sensor spacing chosen and the direction of travel.

Figure 7:
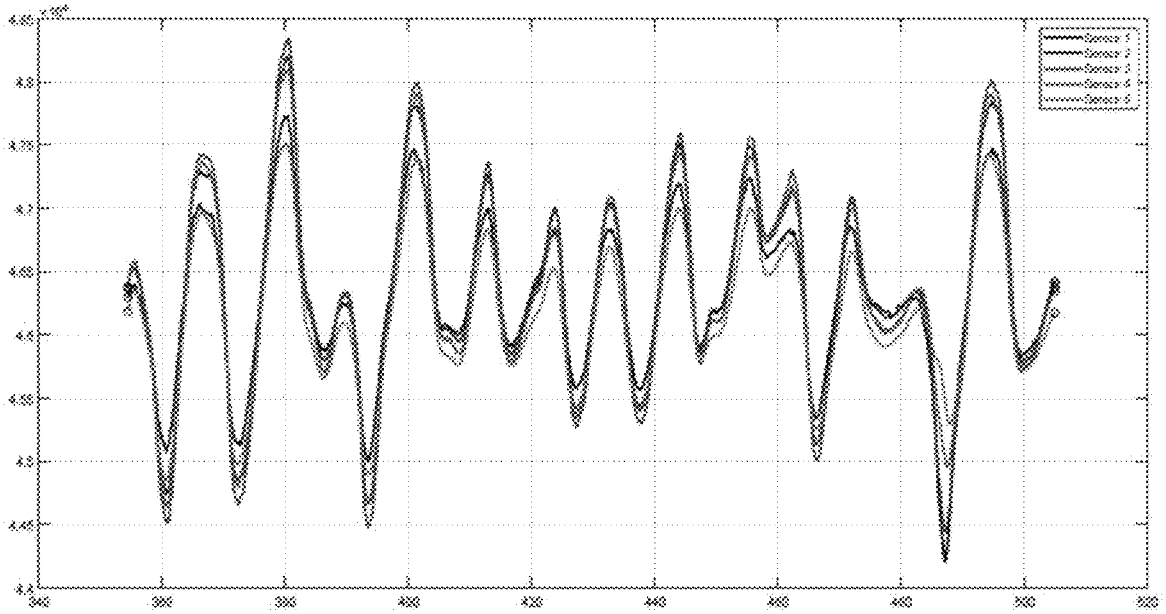
FIG. 7 represents an example of merging of the magnetic data and the position data for each profile.

With reference this time to FIG. 7, the data merge and the correspondence between the position data and the magnetic data are shown in graph form. These are Euclidean data from the magnetic sensors (in nT) on the central profile (#3), as a function of time (in s). To form the interactive magnetic data map, a Gridfit type modeling algorithm developed on matlab is advantageously applied. This type of algorithm makes it possible to model a surface based on the merged data in the form of z=(x, y) as represented in FIG. 7. That being said, other surface modeling algorithms may also be envisaged for obtaining the interactive magnetic map. Other programming languages, such as the Python language in particular, may also be used to model the surface.

Figure 8:
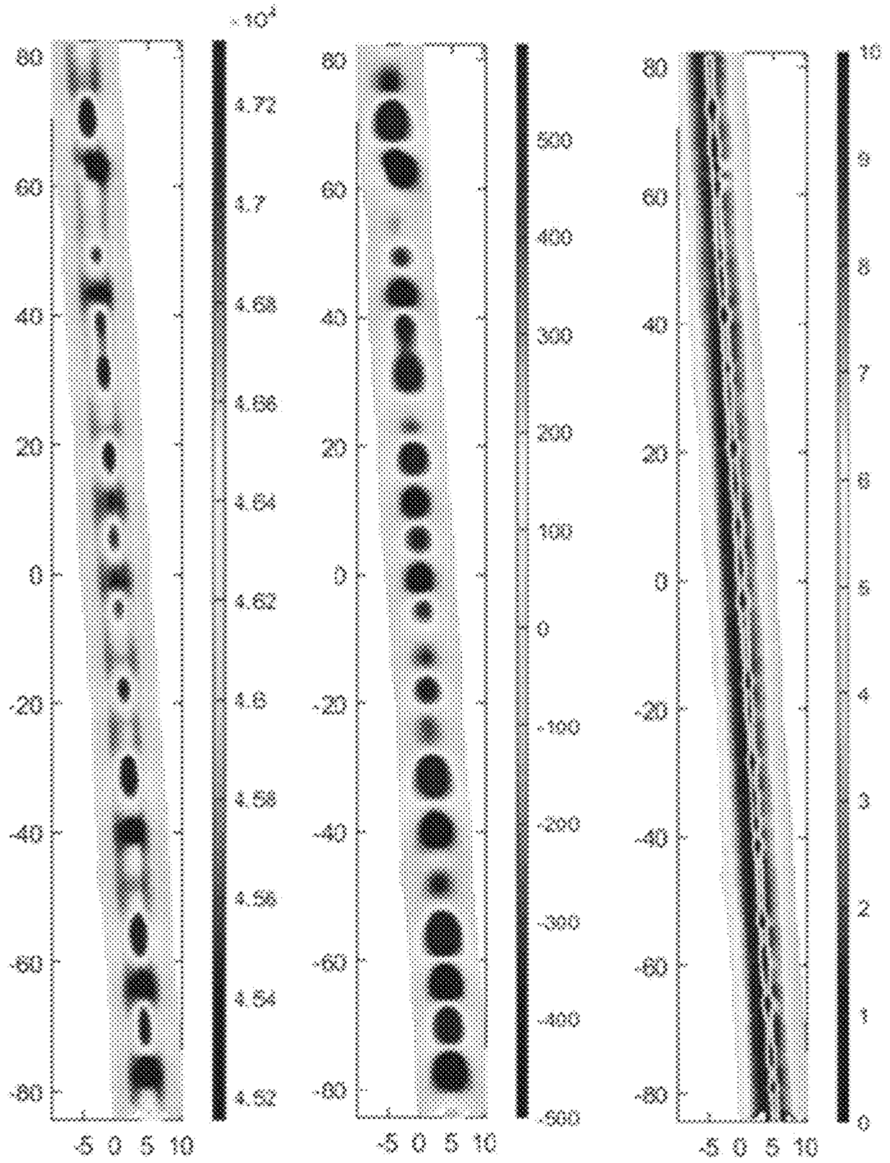
FIG. 8 represents three examples of interactive magnetic data map, FIGS. 9*a*, 9*b* and 9*c* respectively represent an interactive magnetic data map including an anomaly A, the same interactive map with deletion of the data relating to the anomaly and a new interactive magnetic data map corrected for the anomaly A.

Thus, with reference this time to FIG. 8, an interactive magnetic data map is obtained which can be analyzed and modified by the operator. Different types of processing make it possible to obtain interactive maps according to the operator's needs. Thus, FIG. 8 shows, from left to right, three examples of magnetic maps, relating to a single recording, with respectively a map obtained according to a normal signal mode, a map obtained with a norm centered on the median, and a third interactive magnetic data map obtained with a filtered norm.

According to the invention, the interactive magnetic data map generated may be modified by an operator. This feature allows the operator to replace the magnetic data of at least one selected surface with simulated data obtained by interpolation based on the data near the selected surface ensuring data continuity on the interactive magnetic data map.

Generating an interactive magnetic data map is particularly advantageous because it allows an operator to visually analyze magnetic data that, in a certain number of cases, display errors or anomalies that are not only impossible to detect on a structure location map, but that modify the calculation of the actual position of the structure and skew the structure location map.

Generating the interactive magnetic data map furthermore allows the operator to identify sources of error or even phenomena of interest in the vicinity of the pipe threatening or not the integrity of the pipe. Once the analysis has been performed by the operator, the operator can correct or delete these errors, or evaluate the accuracy of certain surfaces, which significantly improves the quality of the location map that can be produced based on the interactive magnetic data map.

Figure 9A:
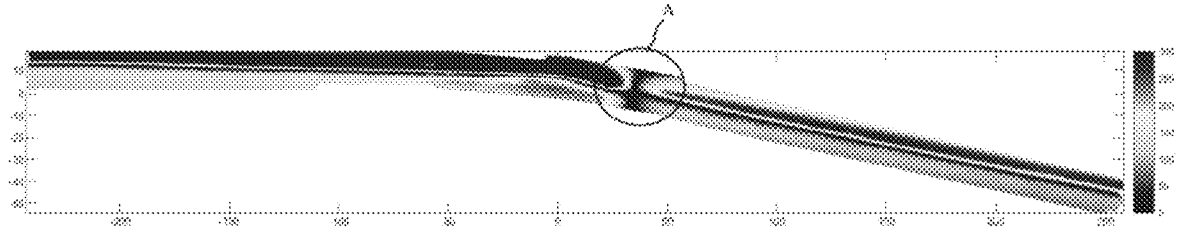
Figure 9B:
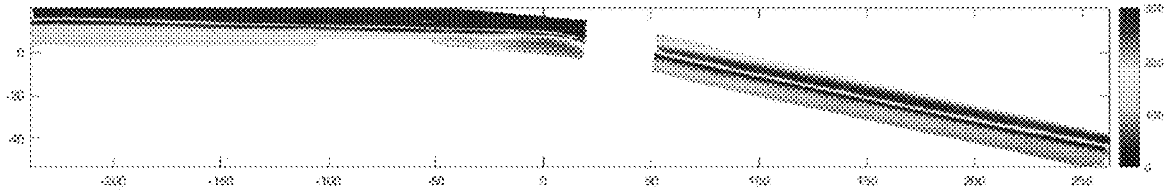
Figure 9C:
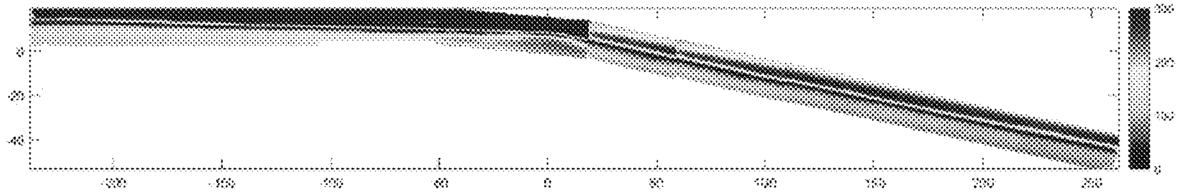

With reference to FIGS. 9*a*, 9*b* and 9*c*, an interactive magnetic data map including an anomaly A (FIG. 9*a*), the same interactive map with deletion of the data relating to the anomaly A (FIG. 9*b*) and a new interactive magnetic data map corrected for the anomaly A (FIG. 9*c*) are respectively represented.

Typically, in FIG. 9*a*, this consists of the signature of an anomaly due to high-frequency interference from a current generator. Indeed, while the detection of metal structures is facilitated when a current is injected at the latter, there is, at the point of injection, a magnetic anomaly generated by the current generator and the transmission cables to the structure.

When the injection point is in the location search zone, the measurement of the magnetic field around the injection point does not correspond only to the magnetic response of the structure, but includes a component linked with the signal injection device. Usually, a location map is generated without correction of the magnetic anomaly, which leads to structure location errors in the zone around the injection point. The present invention makes it possible to overcome this drawback, thus, based on the interactive magnetic data map, a person skilled in the art can detect this anomaly on the interactive magnetic data map and correct it.

Thus, with reference to FIG. 9*b*, it is seen that the surface of the interactive magnetic data map corresponding to the anomaly marked A has been deleted.

To ensure the continuity of the data on the interactive magnetic data map, according to the invention, the step of generating an interactive magnetic data map makes it possible to replace the magnetic data of at least one deleted surface with simulated data obtained by interpolation based on the data near the deleted surface.

With reference this time to FIG. 9*c*, it is seen that the simulated data make it possible to make the junction at the deleted surface. According to a first embodiment, the simulated data are obtained by linear interpolation. However, other types of interpolation may also be envisaged, in particular cubic interpolation.

The modified interactive magnetic data map represented in FIG. 9*c* will then be used to produce the location map of the structure.

It is interesting to note that, according to an advantageous embodiment, each surface modification results in the creation of a new interactive magnetic data map. All or some of the interactive maps are stored in a memory including the data common to the interactive maps and, for each modified interactive map, the simulated data of each modified surface.

Thus, in this embodiment, the interactive magnetic data map represented in FIG. 9*a* and the data attached thereto are stored in a memory as well as the new interactive map represented in FIG. 9*c* and the simulated data of the modified surface.

In another embodiment, only the modified interactive map corresponding to FIG. 9*c* may be retained, the simulated data overwriting in the memory the original data relating to the surface of the anomaly deleted by the operator.

In another embodiment, a type 9*c* map is not produced and the modified interactive map is simply the interactive map wherein the data are deleted as represented in FIG. 9*b*. In this case, the calculation of the simulated data will only occur to allow the switch to the location map so that the latter does not have an undetermined surface. Advantageously, the simulated surfaces of the location map may have a distinctive element and in particular a particular color.

Many types of anomaly, such as the example of anomaly caused by interference associated with an injection point, may also be analyzed and processed.

The processing may consist in deleting the surface identified as having an anomaly, it may also consist, in addition to or as a replacement for the deletion of a surface, in indicating accuracy levels on the interactive map. Accuracy levels will be indicated by the operator according to the magnetic data or GNSS positioning performance based on the accuracy level associated with each frame of the GNSS signal, the type and density of the anomalies detected.

For example, anomalies caused by the presence of several structures may be noted and processed on the interactive magnetic data map by the operator. A typical case is the existence of two pipes close to each other, i.e. at a distance of less than ten meters. In this case, the tracking and location of a pipe is disrupted by the presence of the other pipe. The second pipe indeed creates a magnetic interference that interacts with the magnetic signal of the pipe of interest. The measured magnetic signal is therefore the result of the signals from each pipe and their mutual interaction. Without generating an interactive data map, it is not possible to account for, let alone decorrelate, the contribution of each pipe to the resulting signal. The location of the first pipe is therefore skewed, in general, it is offset toward the second pipe, which impacts geolocation performance. Generating the interactive map allows the operator to identify sequences of quasi-parallel magnetic traces that interact with each other. Once the pipe to be monitored has been identified, it is possible to delete at least partially the magnetic data specific to the second pipe. The operator may also assign a lower resolution level to the interactive map for the map surfaces corresponding to the coexistence of the two pipes.

This type of anomaly, due to the presence of a structure, is also present in the case of geolocation of a pipe based on an injected current. Indeed, considering the condition of the pipes, the latter may have electrical insulation defects. It is therefore customary that in the event of an electrical insulation fault, the injected current on the pipe of interest is partially dispersed on a second pipe or, more generally, on a second nearby structure. In this case, the magnetic data acquired by the magnetic sensors have a component corresponding to the current dispersed in the second pipe, which when generating a direct geolocation map leads to location errors. Based on the interactive magnetic data map, the operator is again able to delete the magnetic data corresponding to the dispersion, these data appearing in the form of magnetic points of lower intensity relative to the signal from the first channel. The step of generating the interactive map thus makes it possible to generate a modified interactive map allowing subsequent production of an enhanced geolocation map.

Another type of anomaly that can be observed is the presence of occasional buried or exposed ferromagnetic objects, these objects leave a visible signature on the interactive map with finite magnetic surfaces near the magnetic surface corresponding to the structure. Again, the operator will be able to modify the interactive magnetic data map to optimize the geolocation map, by deleting the corresponding surfaces. In particular, in the event of doubt on the analysis of the interactive map, they may also indicate lower accuracy levels for the corresponding surfaces, which will generate a display of differentiated accuracy of the location of the structure on the geolocation map.

Figure 10:
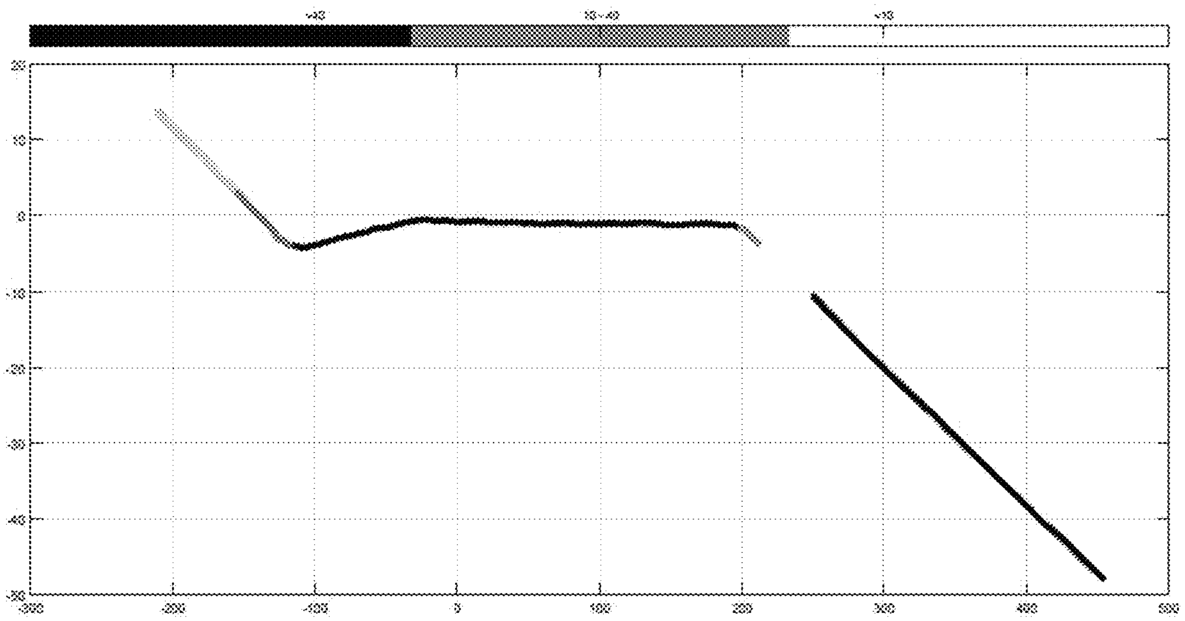
FIG. 10 shows an example of a geolocation map with indication of resolution by zone, obtained from the modified interactive magnetic data map.

In this regard, with reference to FIG. 10, a geolocation map of a pipe with a bend is shown. This map advantageously comprises the site tracking elements and comprises a top grayscale banner. The different grayscales correspond to the display of the structure positioning accuracy. In particular, the lightest grayscale on the right may indicate a geolocation accuracy of less than 10 cm, the central grayscale may indicate an accuracy between 10 and 40 cm and the left grayscale may indicate an accuracy of more than 40 cm.

Of course, other types of display are also possible, in particular by directly indicating, per surface, the numerical value of the positioning accuracy as assessed by the operator. The geolocation process obtained with the mapping process thus includes a first optimization step for deleting, adding or modifying at least one zone directly on the interactive magnetic map and a second step of generating a geolocation map of the structure by using the modified interactive magnetic map and a model linking the magnetic field of a structure with its spatial position.

Furthermore, advantageously, the geolocation process comprises, as described above, a step of identifying the resolution level of at least one surface of the interactive magnetic data map and a step of generating a geolocation map with a display of the accuracy of the geolocation of the structure based on the interactive magnetic map and a model linking the magnetic field of a structure with its spatial position.

Advantageously, the models used for switching from the modified interactive map to the geolocation map use 2D algorithms of the least squares, Powell or Tikhonov type or 3D algorithms of the spherical search type.

Of course, other features of the invention could also have been considered without however falling outside the scope of the invention defined by the claims hereinafter. By way of example, in an embodiment variant, the optimization step for deleting, adding or modifying at least one surface directly on the interactive magnetic data map, may be performed automatically based on processing using artificial intelligence.

The invention claimed is:

1. A mapping process for the condition inspection and/or geolocation of a buried, semi-buried or submerged structure including a metallic or magnetic material characterized in that, based on a vehicle equipped with magnetometers, the process comprises:

scanning a zone to be inspected, acquiring magnetic field and position data by magnetometers associated with position sensors, processing measurements from the acquiring to correct the data according to environmental parameters during data acquisition, and generating an interactive magnetic map allowing an operator to delete, add and/or modify one or more surfaces directly on the interactive magnetic data map.

2. The mapping process according to claim 1 wherein the scanning is performed via successive parallel strips substantially in the main axis of the structure, the width of each strip depending on the spacing between the magnetic field sensors and the resolution to be obtained, the width of the scanned zone depending on the vertical distance between the magnetic field sensors and the center of the structure.

3. The mapping process according to claim 1, wherein the processing includes a prior calibration to compensate the magnetic sources linked with the vehicle, said calibration including a movement of the vehicle in several spatial directions while recording measurements of a substantially constant magnetic field to modify the acquisition parameters so as to minimize the difference between the intensity of the actual magnetic field and the intensity measured by the magnetometers.

4. The mapping process according to claim 1, wherein the processing further includes at least one of a navigation data correction, a magnetic data compensation, and a frequency filtering.

5. The mapping process according to claim 1, further comprising injecting current at the structure is performed during the acquiring the magnetic field data.

6. The mapping process according to claim 1, wherein the generating the interactive magnetic data map makes it possible to replace the magnetic data of at least one selected surface with simulated data obtained by interpolation based on the data near the selected surface ensuring data continuity on the interactive magnetic data map.

7. The mapping process according to claim 6, wherein the interpolation for calculating the simulated data is a linear or cubic interpolation.

8. The mapping process according to claim 6, wherein each surface modification results in the creation of a new interactive magnetic data map, all or some of the interactive maps being stored in a memory including the data common to the interactive maps and, for each modified interactive map, the simulated data of each modified surface.

9. A process for geolocation of a buried, semi-buried or submerged structure including a metallic or magnetic material wherein, based on the interactive magnetic data map obtained with the mapping process according to claim 1, the process including the following steps:

an optimization step for deleting, adding or modifying at least one surface directly on the interactive magnetic data map, a step of generating a geolocation map of the structure by using the modified interactive magnetic data map and at least one model linking the magnetic field of a structure with its spatial position.

10. The geolocation process according to the preceding claim 9, wherein the optimization step includes the modification of at least one surface of the interactive magnetic data map corresponding to measurement and/or processing anomalies.

11. The geolocation process according to claim 9, further comprising:

identifying the level of accuracy of at least one surface of the interactive magnetic data map, generating a geolocation map with a display of the structure geolocation accuracy based on the interactive magnetic data map and at least one model linking the magnetic field of a structure with its spatial position.

12. The mapping process according to claim 1, wherein generating the interactive magnetic data map further comprises merging position data with magnetic data by linearly interpolating the position data with the magnetic data.

* * * * *